(12) United States Patent
Suzuki et al.

(10) Patent No.: US 10,052,732 B2
(45) Date of Patent: Aug. 21, 2018

(54) SPINDLE DEVICE AND MACHINE TOOL

(71) Applicant: NSK LTD., Tokyo (JP)

(72) Inventors: Hidekazu Suzuki, Fujisawa (JP); Atsushi Ishikawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/546,485

(22) PCT Filed: Feb. 15, 2016

(86) PCT No.: PCT/JP2016/054312
§ 371 (c)(1),
(2) Date: Jul. 26, 2017

(87) PCT Pub. No.: WO2016/133050
PCT Pub. Date: Aug. 25, 2016

(65) Prior Publication Data
US 2018/0021907 A1 Jan. 25, 2018

(30) Foreign Application Priority Data
Feb. 16, 2015 (JP) .................................. 2015-027198

(51) Int. Cl.
B23B 45/16 (2006.01)
B25D 9/00 (2006.01)
(Continued)

(52) U.S. Cl.
CPC ................ *B23Q 11/12* (2013.01); *B23Q 5/10* (2013.01); *B23Q 2220/006* (2013.01)

(58) Field of Classification Search
CPC .... B23Q 2220/006; B23Q 5/10; B23Q 11/12; B23Q 11/127; E21B 21/08;
(Continued)

(56) References Cited

U.S. PATENT DOCUMENTS 3,555,962 A    1/1971  Wolf
3,967,771 A *  7/1976  Smith ...................... B25C 1/08
                                                         227/10
(Continued)

FOREIGN PATENT DOCUMENTS

DE       202005018002 U1    1/2006
DE    20 2009 009 424 U1   12/2010
(Continued)

OTHER PUBLICATIONS

International Search Report dated Mar. 8, 2016 issued by the International Searching Authority in counterpart International Application PCT/JP2016/054312 (PCT/ISA/210).
(Continued)

Primary Examiner — Robert Long
(74) Attorney, Agent, or Firm — Sughrue Mion, PLLC

(57) ABSTRACT

A cooling gas is fed from an ejection nozzle into the interior of a through-hole which is formed in a radially central portion of a main spindle, and which penetrates through said main spindle in an axial direction. The cooling gas passes through radial venting holes provided in a plurality of locations, in the circumferential direction, in an axially intermediate portion of the main spindle, is fed into axial venting holes provided in a plurality of locations, in the circumferential direction, extending from one axial-direction end of the main spindle to an intermediate portion thereof, is caused to flow through the axial venting holes, and is discharged from discharge holes.

4 Claims, 3 Drawing Sheets

(51) Int. Cl.
*B25D 11/00* (2006.01)
*B25D 13/00* (2006.01)
*B25D 16/00* (2006.01)
*B23Q 11/12* (2006.01)
*B23Q 5/10* (2006.01)

(58) Field of Classification Search
CPC ........... E21B 2034/007; E21B 47/1025; B25D 9/145; B25D 2209/002; B25D 2250/125; B25D 2250/155; B25D 2250/161; B25D 9/00; G01N 7/00
USPC .......................................... 173/90, 184, 200
See application file for complete search history.

(56) References Cited

U.S. PATENT DOCUMENTS

| | | | | |
|---|---|---|---|---|
| 4,534,500 | A | * | 8/1985 | Jochum ................... B25C 1/008 173/13 |
| 4,601,349 | A | * | 7/1986 | Arentsen ................... E02D 7/10 173/200 |
| 5,458,608 | A | * | 10/1995 | Wortrich .......... A61B 17/00234 227/110 |
| 2007/0110533 | A1 | | 5/2007 | Geissler et al. |
| 2009/0152006 | A1 | * | 6/2009 | Leduc ..................... E21B 21/08 175/48 |
| 2013/0082083 | A1 | * | 4/2013 | Largo ...................... B25C 1/041 227/8 |
| 2014/0209340 | A1 | * | 7/2014 | Moore ................... B25D 9/145 173/112 |
| 2015/0075833 | A1 | * | 3/2015 | Dotan ....................... B23Q 5/06 173/218 |

FOREIGN PATENT DOCUMENTS

| | | |
|---|---|---|
| JP | 63-77636 A | 4/1988 |
| JP | 3-213243 A | 9/1991 |
| JP | 2000-15541 A | 1/2000 |
| JP | 2000-296439 A | 10/2000 |
| JP | 2002-161922 A | 6/2002 |
| JP | 2004-250832 A | 9/2004 |

OTHER PUBLICATIONS

Written Opinion dated Mar. 8, 2016 issued by the International Searching Authority in counterpart International Application PCT/JP2016/054312 (PCT/ISA/237).

Extended European Research Report dated Jan. 30, 2018 by the European Patent Office in counterpart European Application No. 16752436.2.

* cited by examiner

SPINDLE DEVICE AND MACHINE TOOL

TECHNICAL FIELD

The present invention relates to a spindle device.

RELATED ART

A spindle of a machine tool such as a lathe, a grinding machine, a drilling machine and the like is configured to rotate at high speed (for example, a speed of 20,000[min$^{-1}$] or higher) upon using. The spindle is rotatably supported to a housing by a rolling bearing, and the spindle and the rolling bearing are required to be cooled during the rotation of the spindle. Patent Document 1 discloses a structure for cooling the rolling bearing configured to rotatably support the spindle to the housing. According to a structure shown in FIG. 4 of Patent Document 1, an air supply path is formed in a front portion of a hollow spindle (a spindle), and an outer peripheral surface of the spindle is provided with an ejection port. The ejection port is formed to communicate the outer peripheral surface of the spindle and an inner peripheral surface of the air supply path each other. An outer diameter-side opening of the ejection port faces an inner peripheral surface of an inner ring spacer. The inner ring spacer is sandwiched between inner rings configuring a pair of ball bearings configured to rotatably support the spindle to the housing. During the rotation of the spindle, a cooling gas is fed from an upstream-side opening formed in the outer peripheral surface of the spindle into the air supply path, thereby cooling the front portion of the spindle. Also, the cooling gas is ejected from the ejection port and is sprayed to the inner peripheral surface of the inner ring spacer. Thereby, the inner ring spacer and the inner rings are cooled. According to the structure disclosed in Patent Document 1, the processing for forming the air supply path is troublesome, which may increase the manufacturing cost. A rear portion to an intermediate portion of the spindle in which the air supply path is not formed cannot be cooled. That is, a separate cooling mechanism should be provided, as necessary. Also, according to the structure shown in FIG. 4 of Patent Document 1, since the upstream-side opening is provided in the outer peripheral surface of the spindle, it is difficult to increase a sectional area of the air supply path, so that it is difficult to increase a flow rate of the cooling gas. For this reason, there is a possibility that a sufficient cooling effect cannot be achieved.

Patent Document 2 discloses a technology of cooling a spindle and a bearing for rotatably supporting the spindle to a spindle case by means of a cooling gas cooling respective members configuring an electric motor and ejected from a motor case configured to accommodate therein the electric motor. According to the technology disclosed in Patent Document 2, since the cooling gas passes an inside of the bearing, it is necessary to use, as the cooling gas, oil mist obtained by forming oil into a mist shape or an oil air in which atomized oil is mixed. This increases an operating cost. Also, it is difficult to increase a sectional area of an air inlet hole provided at a coupling part between the spindle and a rotary shaft (a motor shaft) of the electric motor, so that it is difficult to secure a flow rate of the cooling gas. Therefore, a sufficient cooling effect may not be obtained.

CITATION LIST

Patent Documents

Patent Document 1: JP 2000-296439 A
Patent Document 2: JP 2004-250832 A
Patent Document 3: JP 2002-161922 A

SUMMARY OF THE INVENTION

Problems to be Solved

The present invention has been made in view of the above situations, and an object thereof is to implement a structure of a spindle device capable of securing excellent cooling performance and preventing an increase in cost.

Means for Solving the Problems

A spindle device of the present invention is to be incorporated into a machine tool such as a lathe, a grinding machine, a drilling machine or the like and includes a housing, a spindle and an electric motor.

The spindle is rotatably supported at a part close to one axial end to the housing by a ball bearing, a rolling bearing such as a cylindrical roller bearing or a rolling bearing unit having combined one or more rolling bearings, a lubrication device and the like. Upon using of the machine tool having the spindle device incorporated therein, a quill (a conveyor table having a circular section), an edged tool or a tool such as a gripper for gripping a member to be processed is mounted to one axial end portion of the spindle.

The electric motor is to rotatively drive the spindle.

Particularly, in the spindle device of the present invention, the electric motor is configured as a so-called built-in motor of which an inner peripheral surface of a stator supported to the housing is made to face an outer peripheral surface of a rotor supported and fixed to an axially intermediate portion of the spindle.

Also, a radially central portion of the spindle is formed with a through-hole configured to axially penetrate the spindle and to communicate one axial end face and the other axial end face of the spindle each other. One axial opening of the through-hole is closed by the tool mounted to one axial end portion of the spindle upon using of the spindle device.

Also, radial venting holes configured to communicate an outer peripheral surface and an inner peripheral surface of the spindle are radially provided at a plurality of circumferential locations of a part closer to one axial side than the part, to which the rotor is supported and fixed, of the axially intermediate portion of the spindle.

Also, axial venting holes configured to communicate one axial end face of the spindle and inner peripheral surfaces of the respective radial venting holes are respectively provided at a plurality of circumferential locations of one axial end portion to the axially intermediate portion of the spindle.

Also, discharge holes configured to communicate the outer peripheral surface of the spindle and inner peripheral surfaces of the respective axial venting holes are respectively provided at a plurality of circumferential locations of a part positioned closer to one axial side than a part, to which the rolling bearing or the rolling bearing unit is externally fitted, of the part close to one axial end of the spindle.

An outer diameter-side opening of each radial venting hole is closed by an inner peripheral surface of the rolling bearing or the rolling bearing unit, or another member such as a sleeve, a blank plug or the like externally fitted and fixed to the outer peripheral surface of the spindle.

When using the spindle device of the present invention configured as described above, a cooling gas is fed from the other axial opening of the through-hole and is discharged from each discharge hole through each axial venting hole and each radial venting hole.

Preferably, when implementing the present invention configured as described above, the respective radial venting holes are provided at a plurality of circumferential locations of a part, which is between the part to which the rolling bearing or the rolling bearing unit is externally fitted and the part to which the rotor is supported and fixed, of the axially intermediate portion of the spindle.

The outer diameter-side opening of each radial venting hole is closed by a sleeve externally fitted and fixed to an outer peripheral surface of the part, which is between the part to which the rolling bearing or the rolling bearing unit is externally fitted and the part to which the rotor is supported and fixed, of the axially intermediate portion of the spindle by interference fit including shrinkage fitting, cooling fitting or the like and having an outer peripheral surface for which finish processing such as grinding processing has been performed.

Preferably, when implementing the present invention configured as described above, one axial end portion of the housing is provided with a closing plate. An inner peripheral surface of the closing plate is made to closely face the outer peripheral surface of a part, which is between the part to which the rolling bearing or the rolling bearing unit is externally fitted and the part at which the respective discharge holes are provided, of the part close to one axial end of the spindle via an annular gap. An outer diameter-side opening of each discharge hole is positioned at a more radially inner side than one axial end-side opening of the annular gap.

Effects of the Invention

According to the spindle device of the present invention configured as described above, it is possible to secure the excellent cooling performance and to prevent the increase in cost.

That is, according to the present invention, when using the spindle device, the cooling gas fed into the through-hole provided in the radially central portion of the spindle circulates inside the through-hole. The cooling gas circulating inside the through-hole is fed to the axial venting holes provided at the plurality of circumferential locations of one axial end portion to the axially intermediate portion of the spindle via the radial venting holes provided at the plurality of circumferential locations of the axially intermediate portion of the spindle. The fed cooling gas circulates inside the respective axial venting holes. Therefore, it is possible to cool the axially intermediate portion of the spindle, at which the rotor configuring the electric motor is supported and fixed, and the part close to one axial end, to which the rolling bearing or the rolling bearing unit is externally fitted, by the cooling gas. According to the present invention, the respective axial venting holes are provided at the plurality of circumferential locations of one axial end portion to the axially intermediate portion of the spindle. For this reason, it is possible to efficiently cool the part close to one axial end of the spindle, to which the rolling bearing or the rolling bearing unit is externally fitted. As a result, it is possible to suppress deformation, i.e., axial deformation of the spindle associated with an increase in temperature, so that it is possible to stabilize the processing precision of the machine tool having the spindle device incorporated therein. Also, it is possible to shorten a time period that is to be consumed until the deformation of the spindle is stabilized, so that it is possible to shorten a warming-up time period of the machine tool. According to the present invention, the respective radial venting holes and the respective axial venting holes are provided at the plurality of locations in the circumferential direction of the spindle. For this reason, it is possible to sufficiently secure the flow rate of the cooling gas. Even in view of this aspect, it is possible to effectively cool the spindle.

Also, according to the present invention, it is also possible to cool an inner ring of the rolling bearing or an inner ring of the rolling bearing configuring the rolling bearing unit, so that it is possible to prolong the lifetime of the rolling bearing or the rolling bearing unit.

According to the present invention, the through-hole is formed to axially penetrate the spindle and the respective radial venting holes are formed to communicate the outer peripheral surface and the inner peripheral surface of the spindle each other. Also, the respective axial venting holes are formed to communicate one axial end face of the spindle and the inner peripheral surfaces of the respective radial venting holes. For this reason, it is possible to easily perform the processing for forming a flow path through which the cooling gas is to pass, so that it is possible to reduce the manufacturing cost of the spindle device. Also, according to the present invention, the cooling gas does not pass an inside of the rolling bearing or the like. For this reason, it is not necessary to configure the cooling gas as the oil mist or oil air, and a compressed air may be used. Therefore, it is possible to suppress the increase in operating cost of the spindle device.

DETAILED DESCRIPTION OF EMBODIMENTS

Figure 1:
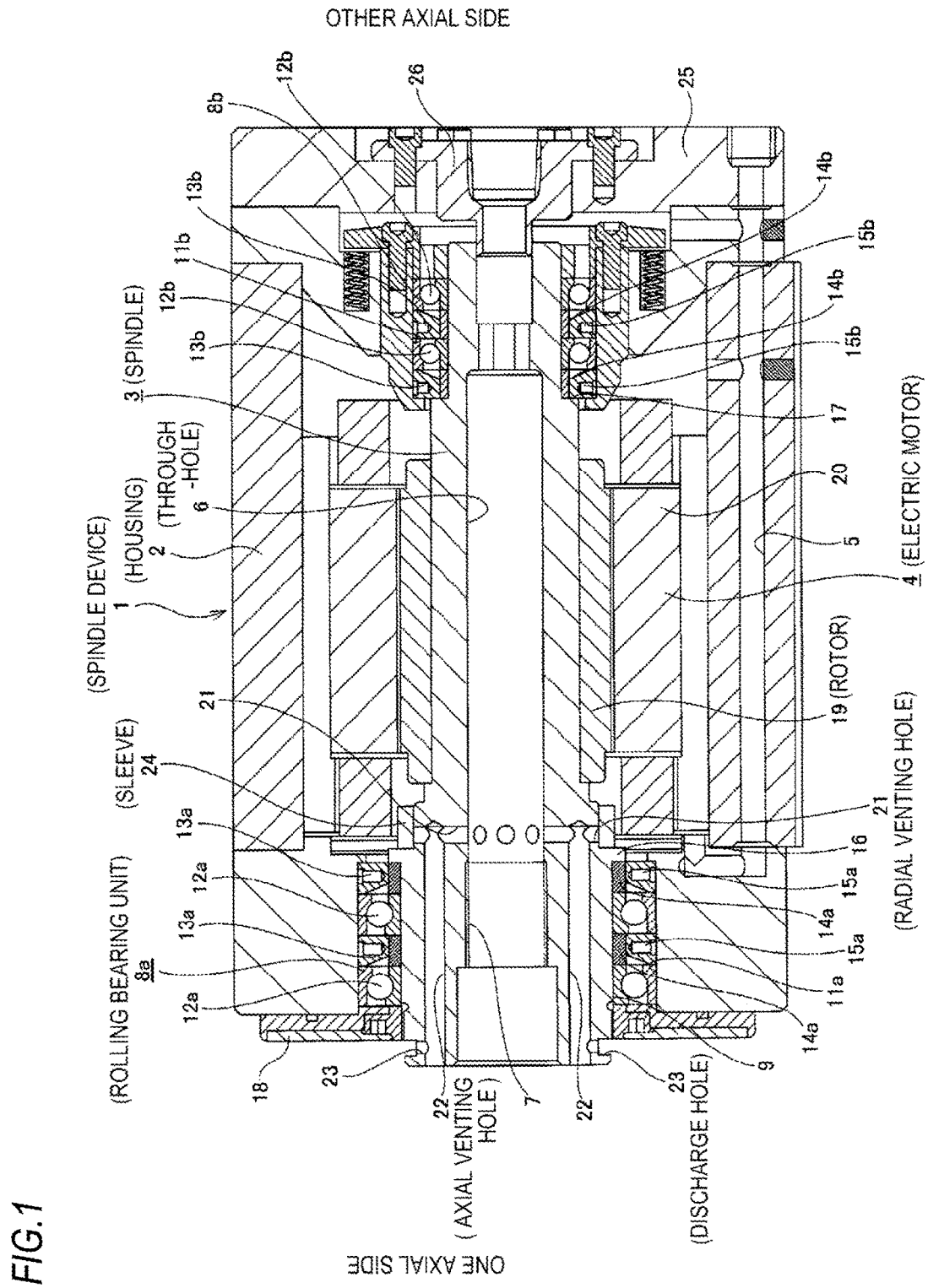
FIG. 1 is a sectional view depicting an example of an embodiment of the present invention.
Figure 2:
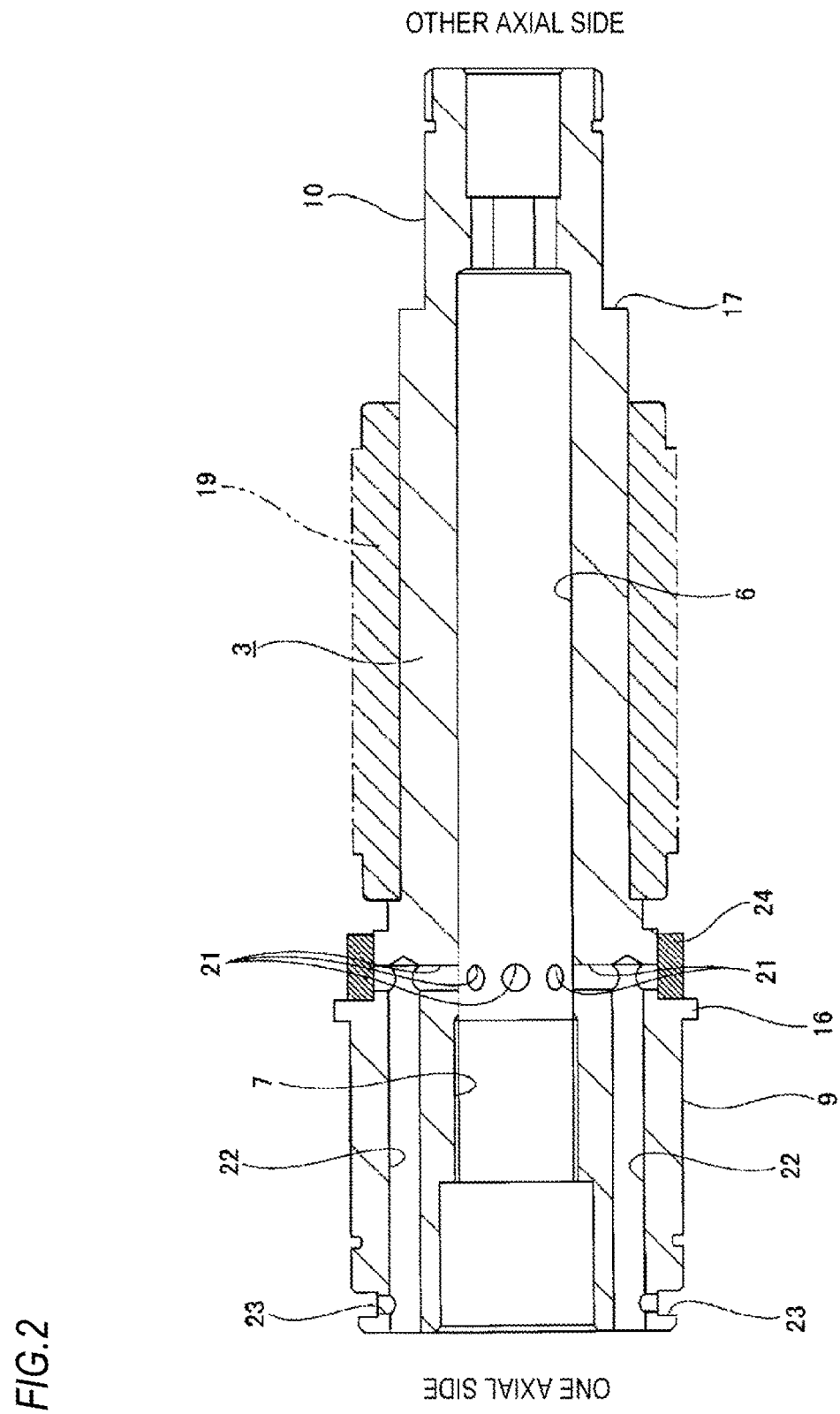
FIG. 2 is a sectional view depicting a spindle and a sleeve.

FIGS. 1 and 2 depict an example of an embodiment of the present invention. A spindle device 1 of the example is to be incorporated into a machine tool such as a lathe, a grinding machine, a drilling machine and the like, and includes a housing 2, a spindle 3 and an electric motor 4. A quill (a support member having a circular section), an edged tool or a tool such as a gripper for gripping a member to be processed is mounted to one axial end portion (a left end portion in FIGS. 1 and 2) of the spindle 3 of the spindle device 1, upon using of the machine tool.

The housing 2 is configured by combining a plurality of members made by casting or forging a metal material such as high-carbon steel, machine structural steel such as chrome-molybdenum steel, or the like. However, the housing 2 may also be integrally configured as a whole. In the example, the housing 2 is provided therein with a housing-side ventilation path 5 for circulating a cooling gas for cooling the housing 2 and other members configuring the spindle device 1.

The spindle 3 has a hollow cylindrical shape of which a radially central portion is formed with a through-hole 6 axially penetrating the spindle 3. A part close to one axial end of an inner peripheral surface of the through-hole 6 is formed with a female screw portion 7 for screwing a male screw portion formed on an outer peripheral surface of a base end portion of the tool. Both axial end portions of the spindle 3 are rotatably supported to an inside of the housing 2 by rolling bearing units 8a, 8b, respectively.

One axial end portion of the spindle 3 is provided with a large-diameter portion 9 having an outer diameter greater than the axially intermediate portion and the other end portion (a right end portion in FIGS. 1 and 2). A radial thickness of the large-diameter portion 9 is greater than radial thicknesses of the axially intermediate portion and the other end portion. Thereby, it is possible to increase strength and stiffness against load that is to be applied from the tool mounted to one axial end portion of the spindle 3 to the large-diameter portion 9 when using the machine tool.

The other axial end portion of the spindle 3 is provided with a small-diameter portion 10 having an outer diameter smaller than the axially intermediate portion and the one end portion. The rolling bearing unit 8a of one axial side (a left side in FIG. 1) is provided between an outer peripheral surface of the large-diameter portion 9 and a bearing holding part 11a provided on an inner peripheral surface of one axial end portion of the housing 2. The rolling bearing unit 8b of the other axial side (a right side in FIG. 1) is provided between the small-diameter portion 10 and a bearing holding part 11b provided on an inner peripheral surface of a part close to the other axial end of the housing 2.

The rolling bearing units 8a, 8b have pairs of rolling bearings 12a, 12b and pairs of lubrication devices 13a, 13b, respectively. In the shown example, the rolling bearings 12a, 12b are configured as angular ball bearings capable of bearing radial and thrust loads. However, each of the rolling bearings 12a, 12b may also be configured as a deep groove-type ball bearing, a cylindrical roller bearing or a conical roller bearing. The rolling bearings configuring the rolling bearing units 8a, 8b may be one or three or more, respectively, and the numbers thereof may be different between the rolling bearing units 8a, 8b. Specifically, for example, the number of the rolling bearings configuring the rolling bearing unit 8a of one axial side may be greater than the number of the rolling bearings configuring the rolling bearing unit 8b of the other axial side.

Each of the lubrication devices 13a, 13b is configured to lubricate each of the rolling bearings 12a, 12b and to cool each of the rolling bearings 12a, 12b by supplying lubricant such as grease to each of the rolling bearings 12a, 12b or injecting oil mist or oil air. Each of the lubrication devices 13a, 13b is provided to be axially adjacent to each of the rolling bearings 12a, 12b. The respective lubrication devices 13a, 13b have inner diameter-side spacers 14a, 14b externally fitted and fixed to the spindle 3 and outer diameter-side spacers 15a, 15b internally fitted and fixed to the bearing holding parts 11a, 11b. As each of the lubrication devices 13a, 13b, a lubrication device having a variety of structures such as a structure disclosed in Patent Document 3 can be used. The lubrication devices 13a, 13b may also be omitted.

In the example, the other axial end face of the inner diameter-side spacer 14a of the lubrication device 13a, which is closest to the other axial side, of the rolling bearing unit 8a of one axial side is butted to one axial side surface of an outward collar portion 16 provided at the other axial end portion of the large-diameter portion 9. Likewise, the other axial end face of the outer diameter-side spacer 15a is butted to an inner end face of the bearing holding part 11a. One axial end face of the inner diameter-side spacer 14b of the lubrication device 13b, which is closest to one axial side, of the rolling bearing unit 8b of the other axial side is butted to a stepped surface 17 provided at one axial end portion of the small-diameter portion 10. Likewise, a tip end face of the outer diameter-side spacer 15b is butted to an inner end face of the bearing holding part 11b. Thereby, the spindle 3 is axially positioned with respect to the housing 2.

In the example, sizes (an inner diameter and an axial width) of the rolling bearing unit 8a of one axial side are greater than sizes of the rolling bearing unit 8b of the other axial side, and a load capacity of the rolling bearing unit 8a of one axial side is greater than a load capacity of the rolling bearing unit 8b of the other axial side. Thereby, when using the machine tool, it is possible to bear the load that is to be applied to the spindle 3 from the tool.

A closing plate 18 having a substantial circle ring shape is supported and fixed to one axial end portion of the housing 2. A part close to one axial end of the spindle 3, to which the rolling bearing unit 8a is externally fitted and fixed, is provided with a member adjacent to one axial side of the rolling bearing unit 8a. An inner peripheral surface of the closing plate 18 closely faces an outer peripheral surface of the member via an annular gap. A part, which is near the inner diameter, of the other axial side surface of the closing plate 18 contacts or closely faces one axial end faces of an inner ring and an outer ring of the rolling bearing 12a, which is closest to one axial side, of the rolling bearing unit 8a. Thereby, it is possible to prevent foreign matters such as processing oil, cut chips, abrasion powders and the like from being introduced into the rolling bearing unit 8a.

The electric motor 4 is configured so that an inner peripheral surface of a stator 20 supported in the housing 2 faces an outer peripheral surface of a rotor 19 supported and fixed to the outer peripheral surface of the axially intermediate portion of the spindle 3. That is, the electric motor 4 is configured as a so-called built-in motor. During an operation of the spindle device 1 or the machine tool having the spindle device incorporated therein, the stator 20 is energized, so that the spindle 3 rotates at high speed (for example, 20,000[$\text{min}^{-1}$] or higher).

Particularly, in the example, radial venting holes 21, 21 configured to communicate the outer peripheral surface and the inner peripheral surface of the spindle 3 each other are radially provided at a plurality of circumferential locations of a part, which is between the large-diameter portion 9 to which the rolling bearings 8a are externally fitted and the part to which the rotor 19 is supported and fixed, of the axially intermediate portion of the spindle 3, for example at eight locations equally spaced in the circumferential direction, respectively.

Axial venting holes 22, 22 configured to communicate one axial end face of the spindle 3 and inner peripheral surfaces of the respective radial venting holes 21, 21 each other are respectively provided at a plurality of circumferential locations of one axial end portion to the axially intermediate portion of the spindle 3, for example, at eight locations equally spaced in the circumferential direction. Also, discharge holes 23, 23 configured to communicate the outer peripheral surface of the spindle 3 and inner peripheral surfaces of the respective axial venting holes 22, 22 each other are respectively provided at a plurality of circumferential locations of a part positioned closer to one axial side than the part, to which the rolling bearings 8a are externally fitted, of the large-diameter portion 9 close to one axial end of the spindle 3, i.e., a part protruding towards one axial side. The plurality of circumferential locations is eight locations equally spaced in the circumferential direction, for example.

An outer diameter-side opening of each of the discharge holes 23, 23 is positioned at a more radially inner side than one axial end-side opening of the annular gap between the inner peripheral surface of the closing plate 18 and the outer peripheral surface of the spindle 3. In the example, the respective radial venting holes 21, 21, the respective axial venting holes 22, 22 and the respective discharge holes 23, 23 are formed so that phases thereof are the same in the circumferential direction of the spindle 3. In the example, an inner diameter of each of the radial venting holes 21, 21 and an inner diameter of each of the axial venting holes 22, 22 are the same, and an inner diameter of each of the discharge holes 23, 23 is smaller than the inner diameter of each of the axial venting holes 22, 22 and the inner diameter of each of the radial venting holes 21, 21.

A metallic sleeve 24 is externally fitted and fixed to an outer peripheral surface of a part, which is between the part to which the rolling bearing unit 8a of one axial side is externally fitted and the part to which the rotor 19 is supported and fixed, of the axially intermediate portion of the spindle 3. In the example, after the sleeve 24 is externally fitted and fixed to the outer peripheral surface of the spindle 3 by interference fit (including shrinkage fitting, cooling fitting or the like), an outer peripheral surface of the sleeve 24 is subjected to finish processing such as grinding processing so as to improve concentricity of the outer peripheral surface of the sleeve 24 and the spindle 3.

The sleeve 24 is externally fitted and fixed to the spindle, so that the outer diameter-side openings of the radial venting holes 21 are closed. Also, instead of the sleeve 24, another member such as a blank plug may be used. Also, when the radial venting holes 21 are formed at axial positions at which the rolling bearing or the rolling bearing unit is arranged, the outer diameter-side openings of the radial venting holes 21 can be closed by the inner peripheral surface of the rolling bearing or the rolling bearing unit. In this case, it is possible to reduce the number of components.

During the using of the spindle device 1 or the machine tool having the spindle device incorporated therein, i.e., during rotation of the spindle 3, a cooling gas (compressed air) is fed from an ejection nozzle 26, which is supported and fixed to a cover body 25 of the housing 2 and has a tip end portion inserted into the other axial opening of the through-hole 6, into the through-hole 6. One axial opening of the through-hole 6 is closed by the tool mounted to one axial end portion of the spindle 3. For this reason, the cooling gas fed into the through-hole 6 is fed to the respective axial venting holes 22, 22 via the respective radial venting holes 21, 21 and is discharged from the respective discharge holes 23, 23.

According to the spindle device 1 of the example, it is possible to secure the excellent cooling performance and to prevent an increase in cost.

That is, according to the example, during the using of the spindle device 1, the cooling gas fed into the through-hole 6 circulates inside the through-hole 6, is fed to the respective axial venting holes 22, 22 via the respective radial venting holes 21, 21, and circulates inside the respective axial venting holes 22, 22. Therefore, it is possible to cool the axially intermediate portion of the spindle 3, to which the rotor 19 configuring the electric motor 4 is supported and fixed, and the part close to one axial end, to which the rolling bearing unit 8a is externally fitted.

Particularly, in the example, since the respective axial venting holes 22, 22 are provided at the plurality of circumferential locations of one axial end portion to the axially intermediate portion of the spindle 3, it is possible to efficiently cool the part close to one axial end of the spindle 3, to which the rolling bearing unit 8a is externally fitted.

Figure 3:
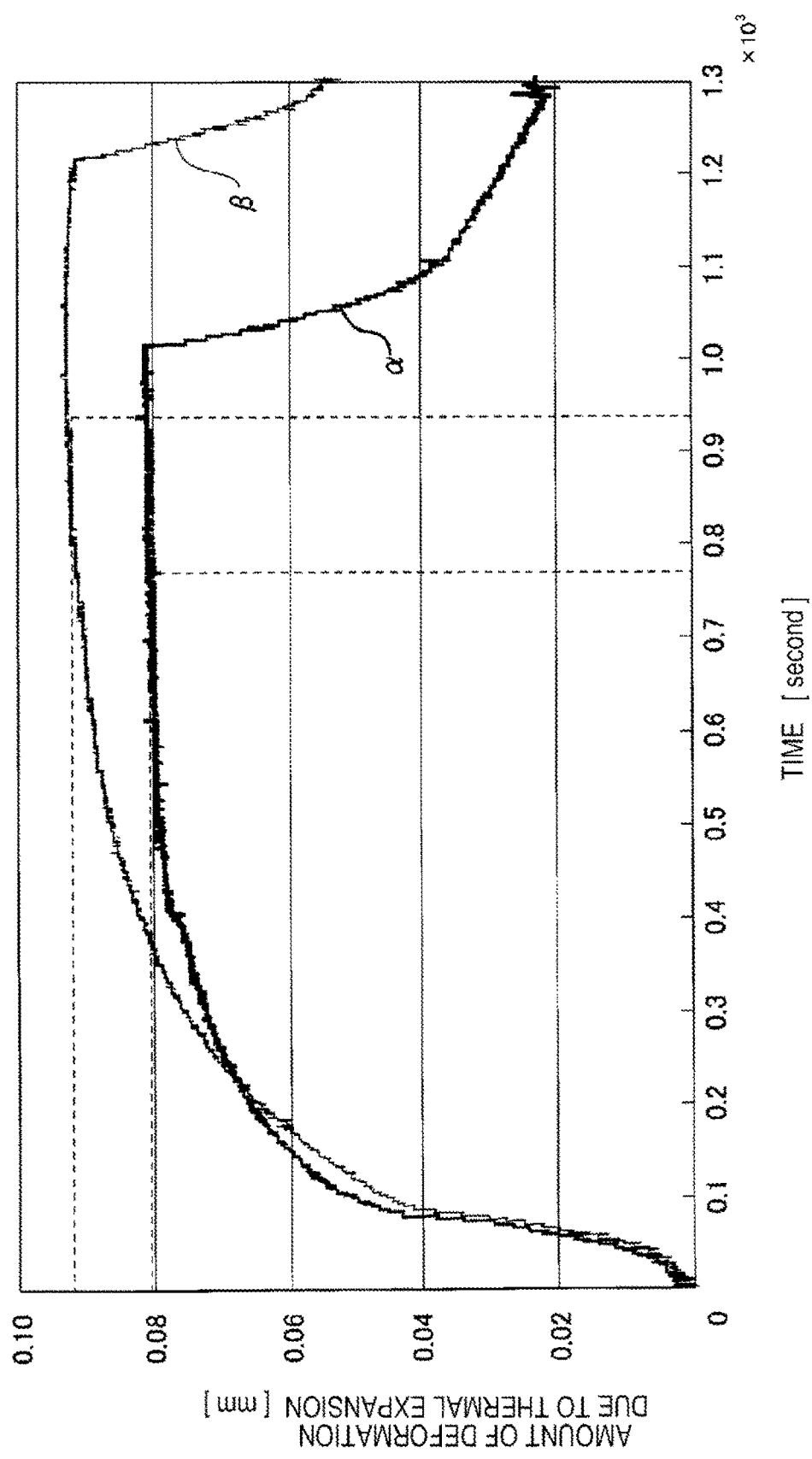
FIG. 3 is a line diagram for illustrating a cooling effect of the present invention.

Herein, FIG. 3 depicts an amount of deformation of the spindle clue to thermal expansion associated with an increase in temperature just after the operation of the spindle device starts. In FIG. 3, a bold solid line α indicates a change in amount of deformation of the spindle 3 configuring the spindle device 1 of the example, and a thin solid line β indicates a change in amount of deformation of a spindle having no axial venting holes.

As can be clearly seen from FIG. 3, according to the spindle device 1 of the example, it is possible to suppress deformation, i.e., axial deformation of the spindle 3 due to the thermal expansion associated with an increase in temperature. Therefore, it is possible to stabilize the processing precision of the machine tool having the spindle device 1 incorporated therein. Also, it is possible to shorten a time period that is to be consumed until the deformation of the spindle 3 is stabilized, so that it is possible to shorten a warming-up time period of the machine tool.

According to the example, since the respective radial venting holes 21, 21 and the respective axial venting holes 22, 22 are provided at the plurality of locations, respectively, it is possible to substantially equalize a sectional area of the through-hole 6, a total sum of sectional areas of the respective radial venting holes 21, 21 and a total sum of sectional areas of the respective axial venting holes 22, 22. That is, a flow path of the cooling gas does not have a part at which a sectional area is excessively reduced. Therefore, it is possible to sufficiently secure the flow rate of the cooling gas. Even in view of this aspect, it is possible to effectively cool the spindle 3.

Also, it is possible to cool inner rings of the rolling bearings 12a, 12a configuring the rolling bearing unit 8a of one axial side externally fitted to the part close to one axial end of the spindle 3, so that it is possible to prolong the lifetime of the rolling bearing unit 8a.

In the example, the through-hole 6 is formed to axially penetrate the spindle 3. Also, the respective radial venting holes 21, 21 are configured to communicate the outer peripheral surface and the inner peripheral surface of the spindle 3, and the respective axial venting holes 22, 22 are configured to communicate one axial end face of the spindle 3 and the inner peripheral surfaces of the respective axial venting holes 22, 22. For this reason, it is possible to easily perform the processing for forming a flow path through which the cooling gas is to pass, so that it is possible to reduce the manufacturing cost of the spindle device 1.

Since the cooling gas does not pass an inside of the rolling bearing or the like, it is not necessary to configure the cooling gas as the oil mist or oil air, and a compressed air may be used. Therefore, it is possible to suppress the increase in operating cost of the spindle device 1.

It is not necessary to provide a rotary joint between the spindle and the housing, like a configuration where a cooling fluid such as cooling water is to circulate in the spindle. For this reason, it is possible to extremely increase the number of rotations (the rotating speed) of the spindle 3. That is, as compared to an allowable rotating speed of about 50,000 [min$^{-1}$] of a rotary joint to be incorporated into a general machine tool spindle device, since the spindle device 1 of the example is not provided with a rotary joint, it is possible to increase an allowable rotating speed of the spindle 3 to about 300,000[min$^{-1}$].

In the example, after the sleeve 24 is externally fitted and fixed to the outer peripheral surface of the spindle 3, the outer peripheral surface of the sleeve 24 is subjected to the finish processing. For this reason, it is possible to make the concentricity of the spindle 3 and the sleeve 24 favorable, so that it is possible to suppress whirling upon the rotation of the spindle 3 and to stabilize the rotation of the spindle 3.

Also, in the example, the outer diameter-side opening of each of the discharge holes 23, 23 is positioned at the more radially inner side than one axial opening of the annular gap between the inner peripheral surface of the closing plate 18 and the outer peripheral surface of the spindle 3. For this reason, it is possible to blow off the foreign matters such as processing oil, cut chips, abrasion powders and the like existing at the periphery of one axial opening of the annular gap by the cooling gas to be discharged from the discharge holes 23, 23. That is, it is possible to achieve an air seal effect. Particularly, in the example, since the inner diameters of the respective discharge holes 23, 23 are smaller than the inner diameters of the axial venting holes 22, 22, it is possible to increase the intensity of the cooling gas to be discharged from the discharge holes 23, 23, thereby improving the air seal effect.

In the example, the so-called built-in motor where the rotor 19 configuring the electric motor 4 for rotatively driving the spindle 3 is supported and fixed to the axially intermediate portion of the spindle 3 is used. For this reason, it is easy to shorten an axial dimension of the spindle device 1 and to miniaturize and lighten the spindle device 1.

When implementing the spindle device 1 of the example, it is possible to appropriately change the numbers and inner diameters of the respective radial venting holes 21, 21, the respective axial venting holes 22, 22 and the respective discharge holes 23, 23. That is, from an aspect of stabilizing the rotation of the spindle 3, it is effective to increase the numbers by reducing the inner diameters. However, in this case, it is difficult to secure the flow rate of the cooling gas. Therefore, the numbers and inner diameters of the respective holes 21 to 23 are determined in design, in correspondence to the rotation stability of the spindle 3 and the required flow rate of the cooling gas.

For example, when the flow rate of the cooling gas is set to 500 L/min, the through-hole 6, the radial venting holes 21, the axial venting holes 22 and the discharge holes 23 may be configured to have following inner diameters.

inner diameter of through-hole: $\phi$22.5 mm
outer diameter of spindle at rotor insertion part: $\phi$45 mm
inner diameter of radial venting hole: $\phi$6 mm
inner diameter of axial venting hole: $\phi$6 mm
inner diameter of discharge hole: $\phi$4 to 5 mm In the example, the spindle device is set so that the total sum of the sectional areas of the respective radial venting holes 21, 21 and the total sum of the sectional areas of the respective axial venting holes 22, 22 are smaller than the sectional area of the through-hole 6. Also, a total sum of sectional areas of the discharge holes 23, 23 is set to be further smaller than each of the total sum of the sectional areas of the respective radial venting holes 21, 21 and the total sum of the sectional areas of the respective axial venting holes 22, 22.

That is, a sectional area of the ventilation path is smaller in order of the through-hole 6, the respective radial venting holes 21 and the axial venting holes 22, and the discharge holes 23, and the sectional area of the ventilation path is reduced towards a downstream side of the ventilation path.

According to the above configuration, since the sectional area is smaller at the more downstream side of the ventilation path, the speed of the cooling gas increases at the more downstream side of the ventilation path. That is, the speed of the cooling gas forms a speed distribution such that the through-hole 6<the radial venting holes 21 and the axial venting holes 22<the discharge holes 23. As a result, the air ejection speed from the discharge holes 23 is kept high, so that it is possible to effectively remove the heat generated from the rolling bearings 12a by means of the cooling gas. Also, the cooling gas is ejected at high speed from the discharge holes 23, so that it is possible to prevent the waste and foreign matters from being introduced into the spindle device. Also, the flow rate of the cooling gas is set to 500 L/min or higher, so that it is possible to blow off a grinding fluid from the discharge holes 23 and to prevent the grinding fluid from being introduced into the spindle device.

Also, it is possible to average the distribution of the cooling gas from the through-hole 6 to the radial venting holes 21 and the axial venting holes 22, so that it is possible to equally cool the part close to one axial end of the spindle 3 to which the rolling bearing unit 8a is externally fitted.

The subject application is based on a Japanese Patent Application No. 2015-27198 filed on Feb. 16, 2015, which is herein incorporated by reference.

DESCRIPTION OF REFERENCE NUMERALS

1: spindle device
2: housing
3: spindle
4: electric motor
6: through-hole
8a, 8b: rolling bearing unit
11a, 11b: bearing holding part
12a, 12b: rolling bearing
13a, 13b: lubrication device
18: closing plate
19: rotor
20: stator
21: radial venting hole
22: axial venting hole
23: discharge hole
24: sleeve

The invention claimed is:
1. A spindle device comprising:
a housing;
a spindle of which a part close to one axial end is rotatably supported to the housing by a rolling bearing or a rolling bearing unit and of which one axial end portion is mounted with a tool when using; and
an electric motor configured to rotatively drive the spindle;
wherein the electric motor is configured such that an inner peripheral surface of a stator supported to the housing faces an outer peripheral surface of a rotor supported and fixed to an axially intermediate portion of the spindle;
wherein a radially central portion of the spindle is formed with a through-hole configured to axially penetrate the spindle,
wherein radial venting holes configured to communicate an outer peripheral surface and an inner peripheral surface of the spindle are provided at a plurality of circumferential locations of a part closer to one axial side than a part, to which the rotor is supported and fixed, of the axially intermediate portion of the spindle,
wherein axial venting holes configured to communicate one axial end face of the spindle and inner peripheral surfaces of the respective radial venting holes are respectively provided at a plurality of circumferential locations of one axial end portion to the axially intermediate portion of the spindle,
wherein discharge holes configured to communicate the outer peripheral surface of the spindle and inner peripheral surfaces of the respective axial venting holes are respectively provided at a plurality of circumferential locations of a part positioned closer to one axial side than a part, to which the rolling bearing or the rolling bearing unit is externally fitted, of a part close to one axial end of the spindle, wherein an outer diameter-side opening of each radial venting hole is closed by an inner peripheral surface of the rolling bearing or the rolling bearing unit or another member externally fitted and fixed to the outer peripheral surface the spindle, wherein one axial end portion of the housing is provided with a closing plate, wherein an inner peripheral surface of the closing plate closely faces the outer peripheral surface of a part, which is between the part to which the rolling bearing or the rolling bearing unit is externally fitted and the part at which the respective discharge holes are provided, of the part close to one axial end of the spindle via an annular gap, wherein an outer diameter side opening of each discharge hole is positioned at a more radially inner side than one axial side opening of the annular gap, and wherein when using the spindle device, a cooling gas is fed from the other axial opening of the through-hole and is discharged from each discharge hole through each axial venting hole and each radial venting hole.

2. The spindle device according to claim 1, wherein the respective radial venting holes are provided at a plurality of circumferential locations of a part, which is between the part to which the rolling bearing or the rolling bearing unit is externally fitted and the part to which the rotor is supported and fixed, of the axially intermediate portion of the spindle, and wherein the outer diameter-side opening of each radial venting hole is closed by an outer peripheral surface of a sleeve to which finish processing is performed after the sleeve is externally fitted and fixed to an outer peripheral surface of the part, which is between the part to which the rolling bearing or the rolling bearing unit is externally fitted and the part to which the rotor is supported and fixed, of the axially intermediate portion of the spindle.

3. A machine tool comprising the spindle device according to claim 1.

4. A machine tool comprising the spindle device according to claim 2.

* * * * *